H. S. JOHNSON.
VEHICLE SIGNALING DEVICE.
APPLICATION FILED FEB. 17, 1915.
1,191,973.
Patented July 25, 1916.
2 SHEETS—SHEET 1.
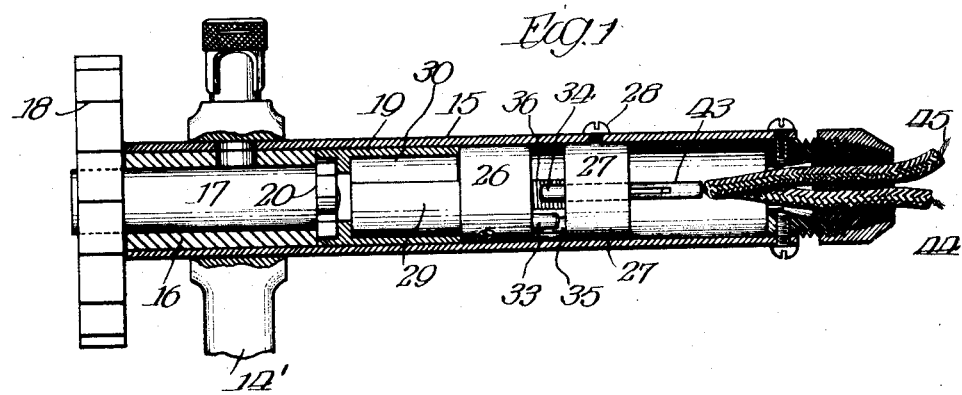
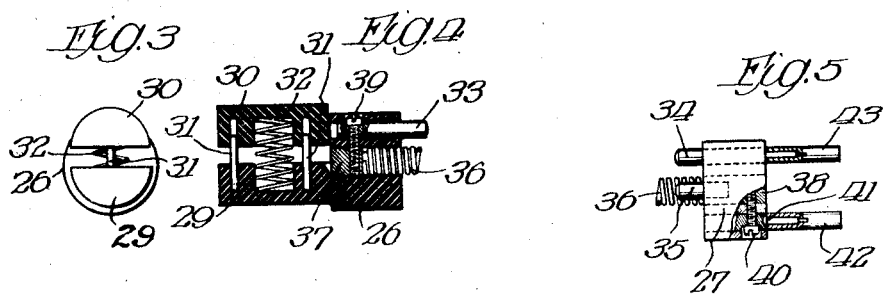
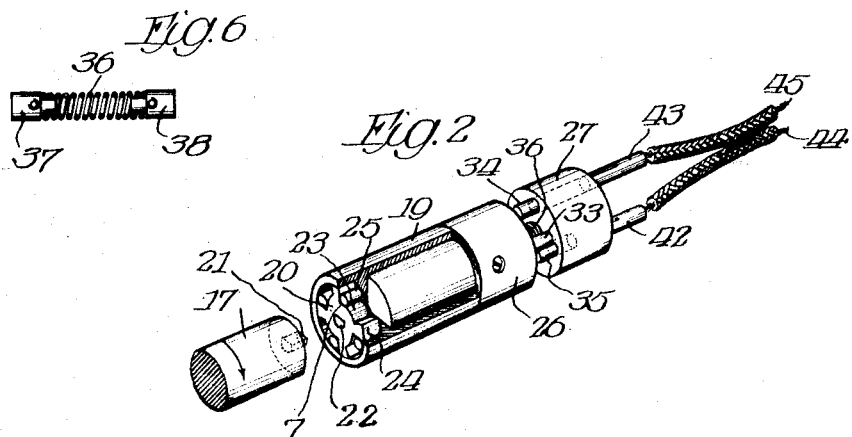
WITNESSES
INVENTOR
Hobart S. Johnson
By Pond & Wilson,
Atty's H. S. JOHNSON.
VEHICLE SIGNALING DEVICE.
APPLICATION FILED FEB. 17, 1915.
1,191,973.
Patented July 25, 1916.
2 SHEETS—SHEET 2.
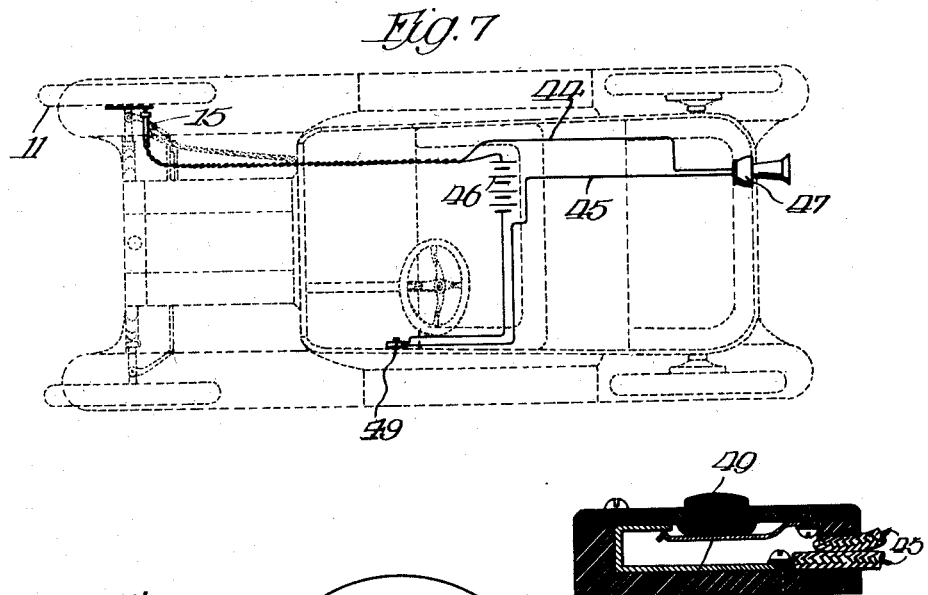
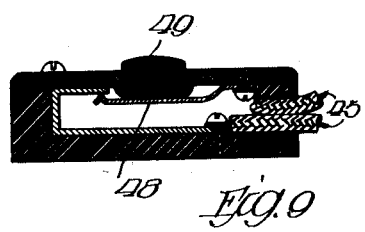
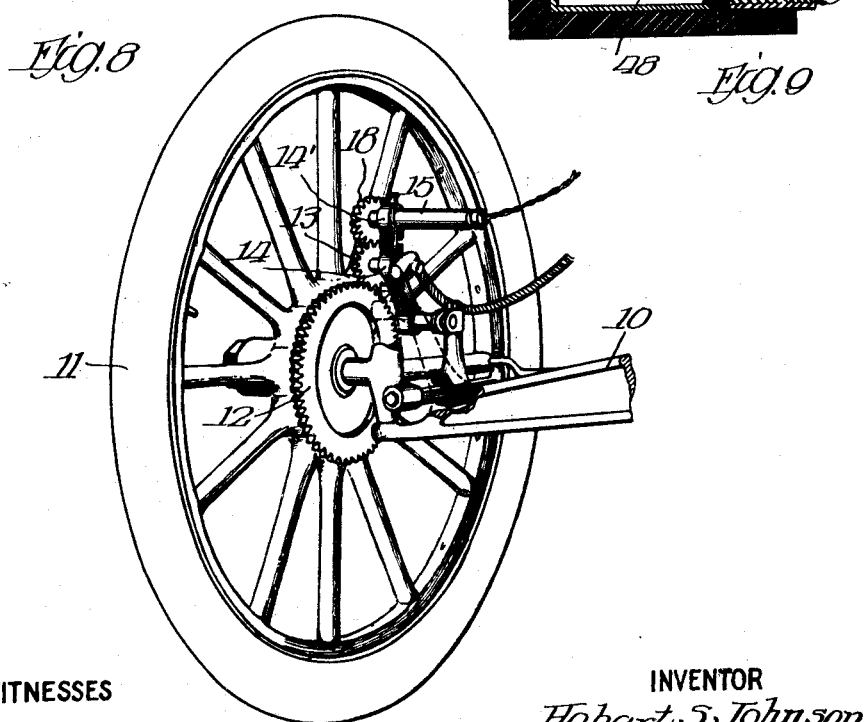
WITNESSES
INVENTOR
Hobart S. Johnson
By Pond & Wilson,
Attys.

UNITED STATES PATENT OFFICE.

HOBART S. JOHNSON, OF MADISON, WISCONSIN.

VEHICLE SIGNALING DEVICE.

1,191,973. Specification of Letters Patent. Patented July 25, 1916.

Application filed February 17, 1915. Serial No. 8,737.

*To all whom it may concern:*

Be it known that I, HOBART S. JOHNSON, a citizen of the United States, residing at Madison, in the county of Dane, State of Wisconsin, have invented certain new and useful Improvements in Vehicle Signaling Devices, of which the following is a specification.

This invention relates to vehicle signaling devices, and has reference more particularly to an improved device for attachment to automobiles, motor trucks, and like vehicles, to give an audible signal, upon a backward movement of the vehicle, thus warning persons who may be standing or passing in rear of the vehicle against danger of being struck and injured through failure to notice the danger of their position.

Signals of this character, which are made operative when the reversing lever of the machine is thrown to its reversing position, have heretofore been known; but such devices, which depend upon the position of the reversing lever, are not always reliable, since the machine not infrequently backs when the reversing lever is in neutral position, as in hill climbing, through sudden failure of the motor or brakes. Again, after the reversing lever is thrown to reverse position, sometimes a period of time elapses before the machine is actually started in motion, and a prolonged audible signal operating before the occasion therefor arises is also objectionable.

In view of the foregoing considerations, I have devised an audible signal that is controlled by the backward movement of the machine itself, rather than being dependent upon the movement of a lever that is preliminary to such backward movement.

In the preferred form of my invention herein shown, the signal is actuated by and from the backward movement of one of the vehicle wheels. This insures not only that the signal will sound upon the backward movement of the vehicle, irrespective of the position of the reversing lever, but it also insures that the signal will not be sounded until the driver is ready for, and actually starts, the backward movement of the vehicle.

The device of my invention, its principle and mode of use, and the benefits and advantages inhering therein, will all be readily understood when considered in connection with the accompanying drawings, wherein I have illustrated an embodiment of the invention which I have found by practical test to operate satisfactorily, and referring thereto—
Figure 1 is a vertical longitudinal section through the circuit-closing device. Fig. 2 is a perspective view, partly in section, of the working parts of the circuit-closing device, the outer casing being removed. Fig. 3 is an end view, and Fig. 4 a longitudinal section, of the carrier of the movable contact-member. Fig. 5 is a side elevation, partly in section, of the member which carries the stationary contact-member, the stop pin, and the circuit-wire terminals. Fig. 6 is a detail of a spring that is interposed between the contact heads or carriers, and normally maintains the contact pins separated. Fig. 7 is a diagram showing the wiring and the position of the various parts when mounted on the vehicle. Fig. 8 is a perspective view of one of the front wheels and a portion of the front axle of an automobile, showing the usual spur gear and speedometer pinion, and a modified bracket adapted to support the automatic contact-closing device of the present invention. Fig. 9 is an enlarged cross-sectional detail through a manually-operated circuit-controlling device which enables the operator to open the circuit and interrupt the signal whenever desired.

Referring to the drawings, 10 may designate the front axle and 11 one of the front wheels of an automobile, and 12 and 13 the usual speedometer gear and pinion, respectively, said pinion being mounted in the usual supporting bracket 14. This bracket is modified to provide a vertical extension 14', in which is securely mounted a sleeve or casing 15. In the outer end of the casing 15 is a bearing block 16, in which is journaled an actuating shaft 17 carrying at one end a pinion 18 that meshes with and is driven by the speedometer pinion 13. It will be seen that, with the described arrangement, the shaft 17 will always be rotated in the same direction as the vehicle wheel 11, turning forwardly when the wheel runs forwardly, and backwardly whenever the vehicle moves in a backward direction. The arrow shown in Fig. 2 indicates the normal direction of rotation of the shaft 17 when the vehicle is moving forwardly. In the casing 15, inwardly of the bearing member 16, is loosely mounted a cylindrical sleeve 19, the outer end of which is bored to receive an automatic clutch member 20 that is drivingly connected to the shaft 17, as by a flat-sided tenon 21 (Fig. 2) on said shaft fitting an axial bore or socket 22 of the clutch member. The clutch member has a series of peripheral cam faces 23, and, between said faces, a corresponding series of radial lugs 24; and coöperating with each cam face, between a pair of lugs, is a roller 25; the lugs 24 operating to space the rollers 25 and also, in coöperation with the bearing 16 and bored sleeve 19, to prevent endwise movement of the clutch member 20 and its actuating shaft 17. This construction, as will be readily seen, provides a roller clutch that is operative to rotate the sleeve 19 when the shaft 17 is turned in a counter-clockwise direction, as viewed in Fig. 2, but is idle when the same is turned in the opposite or clockwise direction.

The sleeve 19 actuates the circuit-closing device, which consists primarily of two cylindrical heads designated as entireties by 26 and 27, respectively, that are made of insulating material, preferably hard fiber. The head 27 is held stationary in the outer casing 15, as by means of a screw 28, shown in Fig. 1. The head 26 turns freely in the casing 15, and its outer portion has a frictional engagement with the sleeve 19, for which purpose it may be formed in a pair of segments 29 and 30, the former of which is an integral part of the head 26, while the latter is mounted and guided thereon by dowel pins 31; the segments 29 and 30 being normally forced apart by an interposed spring 32, whereby the frictional engagement of the split or divided portion of the contact head 26 with the sleeve 19 is maintained. The contact head 26 is provided with a contact pin 33 that projects forwardly of one face thereof; and the contact head 27 is provided with a similar contact pin 34 that projects forwardly of that face thereof that is opposite to the contact head 26. The head 27 is also provided with a stop pin 35, which has no electrical connection. It will be noted by reference to Fig. 2 that the contact pin 33 in the head 26 lies between the stop pin 35 and the contact pin 34 on the head 27. In the normal position of head 26, as shown in Fig. 2, the contact pin 33 rests against the stop pin 35, and the electric circuit in which the contact pins 33 and 34 are included is broken at this point.

A coil spring 36 is interposed between and centrally connects the heads 26 and 27; the ends of this spring, as best shown in Fig. 6, being soldered or otherwise anchored to two metal plugs or heads 37 and 38, which are tapped to receive small screws 39 and 40, respectively (Figs. 4 and 5), whereby said spring is placed in electrical connection with the contact pin 33 and with a terminal post 41 mounted in the head 27. The spring 36 is under tension in such a direction as to tend to keep the contact pins 33 and 34 separated, with the pin 33 lying against the stop pin 35, as shown in Fig. 2. Referring to Figs. 1 and 2, it will be evident that if the head 26 is rotated in a counter-clockwise direction, the contact pin 33 will be brought around against contact pin 34, and the circuit will be closed at that point.

The outer end of terminal post 41 and the outer end of contact pin 34 (which also serves as a terminal post) are reduced and shouldered, as indicated in Fig. 5, to receive terminal clamps in the form of split collars 42 and 43, respectively, the solid ends of which have the circuit wires 44 and 45 soldered or otherwise electrically joined thereto.

In the diagrammatic view, Fig. 7, 46 indicates a battery or other source of current mounted at any convenient point on the automobile; and 44 and 45 indicate the circuit wires between the automatic circuit-controlling device described and an audible signal, such as a horn 47, located preferably at the rear of the vehicle; the battery 46 being included in one of said circuit line-wires.

The operation of the device is as follows: When the vehicle is traveling in a forward direction, the rotation of the shaft 17 is in such a direction as to maintain the cam clutch 20 idle, so that the friction sleeve 19 will not revolve and the shaft 17 will simply turn as an idle shaft. When, however, the vehicle starts to move in a backward direction, the shaft 17 will be instantly rotated in the opposite direction, whereupon the cam clutch 20 will engage the sleeve 19, and the head 26, through its frictional contact with sleeve 19, will be rotated until the contact pins 33 and 34 come together to close the circuit, thereby instantly sounding the alarm 47 and warning any one who may be standing or passing in rear of the vehicle of its movement. As soon as the head 26 has reached the limit of its movement, the sleeve 19 will begin to slip on the friction portion of the head 26, the friction being great enough to hold the contact pins together as long as the rotation continues in this direction under the backward movement of the vehicle. It has been found in practice that when the vehicle is brought to a standstill after moving in a backward direction, it invariably recoils slightly, thereby rotating the shaft 17 in the opposite direction sufficiently to separate the contact pins 33 and 34 and open the circuit, thus avoiding the objection that might exist to maintaining the circuit closed and the signal device in operation after the vehicle has come to a stop and until it moves forwardly again.

In Fig. 9, I have shown a normally-closed spring contact-device 48 interposed in one of the line wires and manually controlled by a push button 49 within convenient reach of the driver, so as to enable the latter, if he chooses, to hold the circuit open while backing. For instance, should he be backing for a long distance, the continuous sound of the horn, when not necessary for warning purposes, might be objectionable on account of its noise and on account of its drain on the battery.

While I have illustrated and described one practicable and workable embodiment of the invention, I do not limit the latter to the specific details disclosed, since these may, obviously, be modified and changed by the skilled mechanic to suit individual taste or circumstances without involving any departure from the principles involved or sacrificing any of the advantages and benefits secured by the invention. It will be obvious to those skilled in the art that the circuit controlling mechanism herein disclosed and claimed may be employed to advantage with other kinds of warning signals, such as visual signals.

I claim:

1. A circuit controlling mechanism for vehicle signaling devices comprising, in combination with the terminals of a normally open circuit, a stationary contact member in said circuit, a movable contact member, a stop limiting the separating movement of said contact members, and means adapted to be geared to a wheel of the vehicle for actuating said movable contact member into engagement with said stationary contact member during backward movement of said wheel, said contact actuating means including a friction clutch operative to permit slip after said contact members have been brought into engagement with each other.

2. A circuit controlling mechanism for vehicle signaling devices comprising, in combination with the terminals of a normally open circuit, a stationary contact member in said circuit, a movable contact member, a stop limiting the separating movement of said contact members, and contact engaging means adapted for operative connection to an element of the vehicle that moves relatively to the latter in one direction while the vehicle is traveling forward and in another direction while the vehicle is traveling backward, said contact engaging means including a friction clutch operative to permit slip after said contact members have been brought into engagement with each other, and also a positive automatic one-way clutch coöperating with one member of said friction clutch to actuate the latter under backward movement only of the vehicle.

3. A circuit controlling mechanism for vehicle signaling devices comprising, in combination with the terminals of a normally open circuit, a stationary contact member in said circuit, a movable contact member, a stop limiting the separating movement of said contact members, and means adapted to be geared to a wheel of the vehicle for actuating said movable contact member into engagement with said stationary contact member during the backward movement of said wheel, said contact actuating means including a friction clutch operative to permit slip after said contact members have been brought into engagement with each other, and also a positive automatic one-way clutch coöperating with one member of said friction clutch to actuate the latter under backward movement only of said wheel.

4. A circuit controlling mechanism for vehicle signaling devices comprising, in combination with the terminals of a normally open circuit, a rotatable contact head carrying an eccentrically mounted contact pin, a stationary contact head carrying a contact pin, and also a stop pin, both disposed across the path of movement of said first-named contact pin, a rotary friction clutch member coöperating with said rotatable contact head, an actuating shaft adapted to be geared to a wheel of the vehicle, and a positive automatic clutch between said shaft and said friction clutch member, said positive clutch being operative upon backward rotation, and idle upon forward rotation, of said vehicle wheel.

5. A circuit controlling mechanism for vehicle signaling devices comprising, in combination with the terminals of a normally open circuit, a rotatable contact head carrying an eccentrically mounted contact pin, a stationary contact head carrying a contact pin and also a stop pin, both disposed across the path of movement of said first-named contact pin, a spring normally urging said contact pins apart, a rotary friction clutch sleeve coöperating with said rotatable contact head, an actuating shaft adapted to be geared to a wheel of the vehicle, and a rotary cam clutch between said shaft and said friction clutch sleeve, said cam clutch being operative upon backward rotation, and idle upon forward rotation, of said vehicle wheel.

6. In a signal circuit, two contact members, resilient means for holding said members normally separated, a rotatable member adapted by its rotation to move one of said contact members into contact with the second one to close the circuit, said rotatable member having frictional engagement with said contact member whereby it is moved into contact with the second contact member and retained in contact position as long as the rotation of said rotatable member continues, and means for rotating said rotatable member.

HOBART S. JOHNSON.

Witnesses:
A. B. MOREY,
HELEN SCHMITT.